W. V. TURNER.
AUTOMATIC BRAKE VALVE DEVICE.
APPLICATION FILED JULY 1, 1911.
1,078,021.
Patented Nov. 11, 1913.
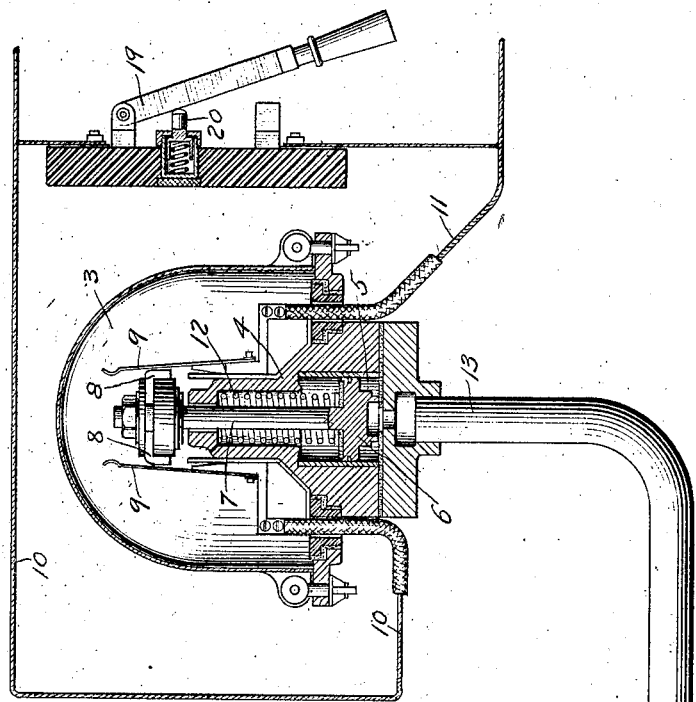
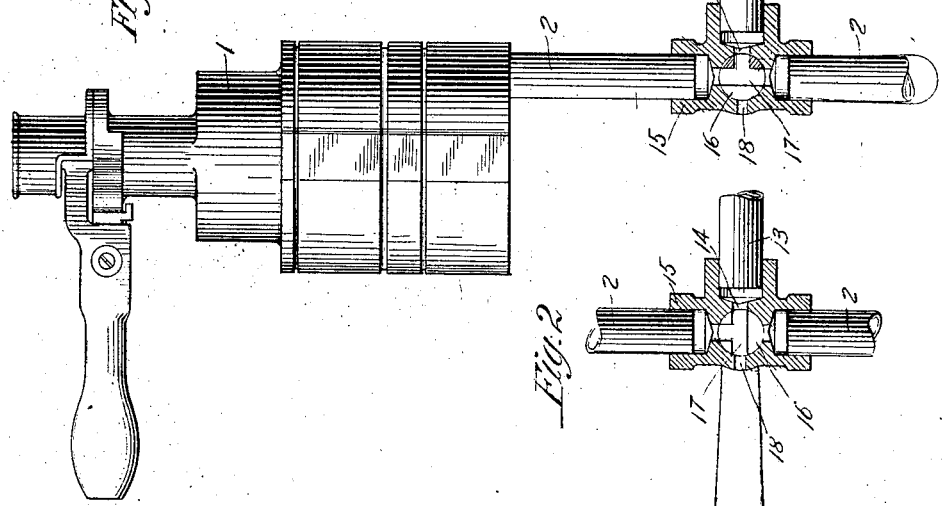
WITNESSES
INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

AUTOMATIC BRAKE-VALVE DEVICE.

1,078,021.   Specification of Letters Patent.   Patented Nov. 11, 1913.

Application filed July 1, 1911. Serial No. 636,547.

*To all whom it may concern:*

Be it known that I, WALTER V. TURNER, a citizen of the United States, residing at Edgewood, in the county of Allegheny and State of Pennsylvania, have invented new and useful Improvements in Automatic Brake-Valve Devices, of which the following is a specification.

This invention relates to fluid pressure brakes, and more particularly to a safety device for brake valves employed in electric traction service.

In double end equipments, where a brake valve is provided at opposite ends of the vehicle, if the brake valve is of the equalizing discharge valve type, when the train pipe pressure is reduced to effect an application of the brakes by manipulation of the brake valve at one end of the car, the reduced train pipe pressure is present on the equalizing piston of the brake valve at the opposite end of the car, and by reason of leakage around the equalizing piston, the pressure in the equalizing reservoir is liable to be reduced. With the equalizing reservoir pressure so reduced, upon increasing the train pipe pressure to release the brakes, the equalizing piston of the brake valve not in use may be lifted by the increased train pipe pressure so as to operate the train pipe discharge valve and vent air from the train pipe. This is highly undesirable, as the time required to release the brakes is thus prolonged, and in addition, more or less air is wasted. To overcome this difficulty, it is customary to provide a cut-out cock in the train pipe connection to the brake valve so that train pipe communication with the brake valve may be cut off on the end of the car which is not occupied. With this arrangement, however, it sometimes happens that the operator fails to open the cut-out cock in going from one end of the car to the other and so, when he attempts to secure a reduction in train pipe pressure to apply the brakes, he finds that he is unable to do so. It is also desirable that cars should only be run when the train pipe pressure is at a predetermined degree, as with a low train pipe pressure, at critical times the braking power may be inadequate and this may result in serious accidents.

The principal object of my invention therefore consists in providing a safety device for preventing the starting of the car unless the train pipe cut-out cock is open and also unless there is a predetermined degree of pressure in the train pipe.

My invention is more particularly designed for application in connection with electrically operated cars and broadly consists in providing a switch device for controlling the car motor circuits, and means for operating said switch to hold the motor supply circuits open at a predetermined low degree of train pipe pressure or when the train pipe cut-out cock is in its closed position.

In the accompanying drawing, Figure 1 is an elevational view, partly in section, of a brake valve device with my improvement applied thereto and Fig. 2 a detail view of the train pipe cut-out cock in its closed position.

According to the drawing, the construction may comprise a brake valve device 1 of any desired type having the usual train pipe connection 2 and an electric switch device 3 comprising a casing 4 having a piston chamber 5 containing a piston 6. The piston 6 is provided with a stem 7 carrying on its outer extremity contacts 8 adapted in the outer position of the piston 6 to engage contact fingers 9. One contact finger 9 is connected to the motor supply wire 10 and the other contact finger 9 is connected to the wire 11 through which current is supplied to the car motors. One side of the piston 6 is subject to the pressure of a spring 12 and the opposite side of the piston is connected by a pipe 13 with a port 14 in a cut-out cock 15 contained in the train pipe connection 2.

The cut-out cock 15 is provided with a plug cock or valve 16 having a three-way passage 17 adapted in one position of the cock to establish communication from the brake valve through the train pipe connection 2 and from the piston 6 to said train pipe connection, and in another position to close communication through said train pipe connection and connect the piston 6 and the brake valve side of the train pipe connection 2 with an atmospheric exhaust port 18.

When the motorman takes a car out preparatory to a run, he starts the compressor, opens the cut-out cock 15, as shown in Fig. 1, and then moves the brake valve to running position. Air is thus admitted to the train pipe through the passage 17 and also to the face of the piston 6. With no fluid pressure on the piston 6, the spring 12 holds the contacts 8 in open position, so that current cannot flow to the controller for operating the car motors and consequently the car cannot be moved. When the train pipe pressure has increased to a degree sufficient to overcome the tension of the spring 12, the piston 6 is operated and the contacts 8 close the motor supply circuit through the contact fingers 9 so that the car motors may then be started.

The piston 6 is preferably constructed with a differential area, so that in its seated position, only a reduced area thereof is subject to the train pipe pressure, thus requiring the train pipe pressure to be built up to a certain degree before the piston is operated, while in the open position of the piston, the full area of the piston is exposed to train pipe pressure and the piston 6 only moves to closed position when the train pipe pressure has fallen to a dangerously low point.

It will thus be seen that the car cannot be operated until the train pipe pressure has been raised to a predetermined degree and also in running, if the train pipe pressure falls too low, the switch automatically opens and cuts off current from the car motors so as to cause the car to stop until the train pipe pressure is restored.

If the cock 15 is in its closed position, as shown in Fig. 2, the piston 6 is open to the exhaust port 18, thus causing the spring 12 to hold the piston and the switch contacts in open position. It will thus be apparent that if the operator should neglect to open the cut-out cock, the car cannot be started and furthermore he will be warned that the cut-out cock is closed, when he turns the brake valve to running position, by the escape of air through the exhaust port 18.

At times, it may be desirable to be able to move a car even when the air pressure is depleted, such as in the case of barn repairs, or a burning car barn, or the like, and for this purpose a self opening switch may be provided for closing the motor circuit independently of the position of the automatic switch. As shown in Fig. 1 this emergency switch may consist of a knife switch 19 adapted to complete the motor circuit from the wire 10 to the wire 11 and a spring device 20 for normally holding said switch in its open position.

If the operator desires to start the car he must hold the knife switch closed so long as current is to be supplied to the car motors, as upon removing his hand from the switch, the same automatically opens.

Having now described my invention, what I claim as new and desire to secure by Letters Patent, is:

1. In a fluid pressure brake, the combination with a train pipe, of a device for controlling the power for operating the vehicle, said device being adapted to cut off the power upon a predetermined reduction in train pipe pressure, and a self-opening switch adapted to be manually closed for supplying power to the vehicle.

2. In a fluid pressure brake, the combination with a train pipe, of an electric switch device operating upon a predetermined reduction in train pipe pressure for opening the circuit for supplying current to operate the vehicle, and a self-opening switch adapted to close said circuit when manually operated.

3. In a fluid pressure brake, the combination with a train pipe, of an electric switch for controlling the supply of current to the car motors, a piston subject to train pipe pressure for operating said switch, and an automatically opening switch adapted to be manually operated for supplying current to the car motors.

4. In a fluid pressure brake, the combination with a train pipe, of an electric switch for controlling the supply circuit of the car motors, a piston operating upon a predetermined reduction in train pipe pressure for opening said switch, and a switch subject to spring pressure for normally maintaining same in open position, and adapted to be actuated manually for closing said circuit.

5. In a fluid pressure brake, the combination with a train pipe, of an electric switch for controlling the supply of current to the car motors, and a piston operating upon a predetermined increase and a predetermined reduction in train pipe pressure for respectively closing and opening said switch.

6. In a fluid pressure brake, the combination with a train pipe, of an electric switch for controlling the supply of current to the car motors, and a piston operating at one degree of train pipe pressure for opening and at another degree of train pipe pressure for closing said switch.

7. In a fluid pressure brake, the combination with a train pipe, a brake valve, and a cut-out cock for cutting off the train pipe from the brake valve, of a device for controlling the supply of power for operating the car and means for operating said device to cut off the power in the closed position of said cut-out cock.

8. In a fluid pressure brake, the combination with a train pipe, a brake valve, and a cut-out cock for cutting off the train pipe from the brake valve, of a device for controlling the supply of power for operating the car, and means adapted upon movement of said cut-out cock to the closed position for operating said device to cut off the supply of power.

9. In a fluid pressure brake, the combination with a train pipe and a brake valve, of a switch device operated by the train pipe pressure for controlling the supply of current for the car operating motors, and a train pipe cut-out cock adapted in open position to connect said switch device with the train pipe and in closed position with the atmosphere.

10. In a fluid pressure brake, the combination with a train pipe and a brake valve, of a switch device operated by the train pipe pressure for controlling the supply of current for the car operating motors, and a train pipe cut-out cock adapted in open position to supply fluid to said switch device for operating the same to close the motor supply circuit and in closed position to vent air from said switch device to thereby effect the opening of the motor supply circuit.

11. In a fluid pressure brake, the combination with a train pipe and a brake valve, of a switch for controlling the car motor supply circuit, a piston subject to the opposing pressures of the train pipe and a spring for operating said switch, and a train pipe cut-out cock having means adapted in its open position for supplying fluid at train pipe pressure to said piston and for venting fluid from said piston in the closed position of the cock.

In testimony whereof I have hereunto set my hand.

WALTER V. TURNER.

Witnesses:
A. M. CLEMENTS,
WM. J. GILMARTIN.